United States Patent [19]

Beckmann

[11] 4,408,890

[45] Oct. 11, 1983

[54] PIGMENT PRE-BLENDING MIXHEAD ATTACHMENT

[75] Inventor: Charles H. Beckmann, Getzville, N.Y.

[73] Assignee: E. I. Du Pont de Nemours and Company, Wilmington, Del.

[21] Appl. No.: 242,582

[22] Filed: Mar. 11, 1981

[51] Int. Cl.³ .............................................. B01F 15/02
[52] U.S. Cl. .................................... 366/155; 366/168; 366/171; 366/339
[58] Field of Search ...................... 366/10, 13, 14, 150, 366/154, 155, 165, 167, 168, 171, 241, 336, 337, 338, 339, 169, 173, 178, 325; 264/74, 171; 425/131.1, 133.1; 239/402, 405, 406, 419, 419.3, 423, 427.3

[56] References Cited

U.S. PATENT DOCUMENTS

| | | | |
|---|---|---|---|
| 1,734,747 | 11/1929 | Seeley | 366/168 |
| 1,777,141 | 9/1930 | Howden | 239/419 |
| 2,161,553 | 6/1939 | Westberg | 366/13 |
| 2,816,518 | 12/1957 | Daggett | 366/178 X |
| 3,286,992 | 11/1965 | Armeniades et al. | 259/4 |
| 3,528,131 | 9/1970 | Duggins | 18/13 |
| 3,800,985 | 4/1974 | Grout et al. | 222/146 |
| 3,920,223 | 11/1975 | Krueger | 366/295 X |

FOREIGN PATENT DOCUMENTS

| | | | |
|---|---|---|---|
| 1066545 | 6/1955 | Fed. Rep. of Germany | 366/325 |
| 2074950 | 8/1978 | Fed. Rep. of Germany | 264/75 |
| 1205675 | 9/1970 | United Kingdom | 366/339 |

Primary Examiner—Harvey C. Hornsby
Assistant Examiner—Christine A. Peterson
Attorney, Agent, or Firm—William H. Thrower

[57] ABSTRACT

An attachment to a dynamic mixhead allows pigment to be fully blended with a specified volumetric portion of a reactive polymer mix immediately prior to its passing through an in-line motionless mixer. The fully pigmented portion of the mix passes into the motionless mixer concurrently with the nonpigmented remainder of the polymer mix, each portion constituting a discrete stream and positioned in a manner facilitating rapid, improved blending. The pigment pre-blending attachment possesses particular utility for partial or incomplete blending applications, wherein striations of color are desired to impart a marbled effect.

3 Claims, 3 Drawing Figures

PIGMENT PRE-BLENDING MIXHEAD ATTACHMENT

BACKGROUND OF THE INVENTION

1. Field of the Invention

This invention has specific application in the field of man-made building products which simulate natural stone, although it is generally useful for any blending operation involving a motionless mixer wherein partial pigmentation involving two or more differently-colored streams of material is necessary or desired.

2. Description of the Prior Art

The beautiful appearance and extraordinary durability of marble have been recognized for centuries and have created great demand for its use in a multitude of contexts, many of them architectural. In recent years, the often prohibitive cost of marble has resulted in numerous attempts to simulate this natural stone using less expensive man-made materials. Products resembling marble have been produced by incorporating streams of pigment into filled resin bases. The material is generally made by combining a polymeric resin with an inert filler and thereafter adding and swirling in a pigment before gelation, or curing, of the material takes place.

The art indicated that at one time most producers of "marbleized" products swirled the coloring or veining pigments into the products manually in much the same random, uncontrolled way as two-flavor "marble" cakes are prepared. Such products lacked the relative uniformity of vein structure which characterizes real marble. An additional problem with manual swirling was the amount of time required to remove the already-curing polymeric resin from the automatic mixer in which the reactive additives had been added to a site suitable for manual mixing. Since marbleizing must be completed before the resin begins to crosslink, or cure, time is of the essence in these operations.

More recently, manufacturing methods dispensing with manual marbleization steps have been developed. For example, Duggins, U.S. Pat. No. 3,488,246, Jan. 6, 1970, discloses a simulated marble building product produced by a "relatively high speed continuous operation apparatus and process". In the Duggins process, streams of pigment having a relatively low viscosity, i.e., in the range of about 0.9 to about 3.0 poises, are added to a mass of polymerizing material having a relatively high viscosity, whereupon the viscous mass is subjected to low intensity mixing action to progressively displace the separate streams of pigment throughout.

Motionless mixers of the type disclosed by Grout et al., U.S. Pat. No. 3,800,985, Apr. 2, 1974, are useful in the commercial preparation of simulated marble products for a number of reasons. These mixers can be attached directly to the dynamic mixheads used to thoroughly blend reactive additives into the resin base, and can produce a streaked or striated (rather than homogeneously colored) product in a sufficiently short period of time. In the motionless mixer, material is rotated successively in alternating right- and left-handed directions transverse to the cylindrical conduit through which it travels. Between each such reversal, the material is subdivided into two streams. The flow at the center of each rotating segment is accelerated and the flow at the edges is decelerated, so that each particle of material is caused to travel continuously from the center of flow to the edges and back again. Only when the material is of homogeneous viscosity, however, is this the case.

In the methods of the prior art, it has been attempted to introduce into a motionless mixer two discrete streams: a low volume, low viscosity pigment stream and a high volume, high viscosity polymer stream. In such attempts to obtain marbleization, partial blending becomes a difficult task and the material must pass through many successive direction rotations in order to achieve a marbled appearance. Further, this marbled appearance has a tendency to vary significantly from batch to batch. These variations in appearance are troublesome in instances in which it is desired to match the products of one batch with that of another, for instance, where a simulated marble countertop is to be assembled from two or more separate pieces of material.

The prior art, as exemplified above and as it relates to the preparation of simulated marble building products, has an unfulfilled need for a mixing device that lends itself to current commercial practice and makes possible the attainment of marbled products having acceptably uniform striations and a consistently realistic appearance.

SUMMARY OF THE INVENTION

There is provided by the present invention a mixhead attachment for preparing a viscous fluid for marbled pigmentation, said attachment conveying said fluid from a mixhead to an in-line motionless mixer, said attachment comprising:

a generally cylindrical housing having an inlet end adapted for attachment to said mixhead and an outlet end adapted for attachment to said motionless mixer;

an open-ended, generally cylindrical tube coaxially positioned within said housing and radially separated therefrom, providing a first annular passage for the flow of a portion of said fluid;

means for securing said tube within said housing;

a mixing shaft rotatably mounted within said tube and radially separated therefrom, providing a second annular passage for the flow of the balance of said fluid;

a plurality of fins mounted on said mixing shaft and partially extending into the second annular passage;

means for rotating said mixing shaft; and means for allowing the introduction of pigment into said second annular passage wherein substantially complete pigmentation of the balance of said fluid occurs.

DETAILED DESCRIPTION OF THE INVENTION

Figure 1:
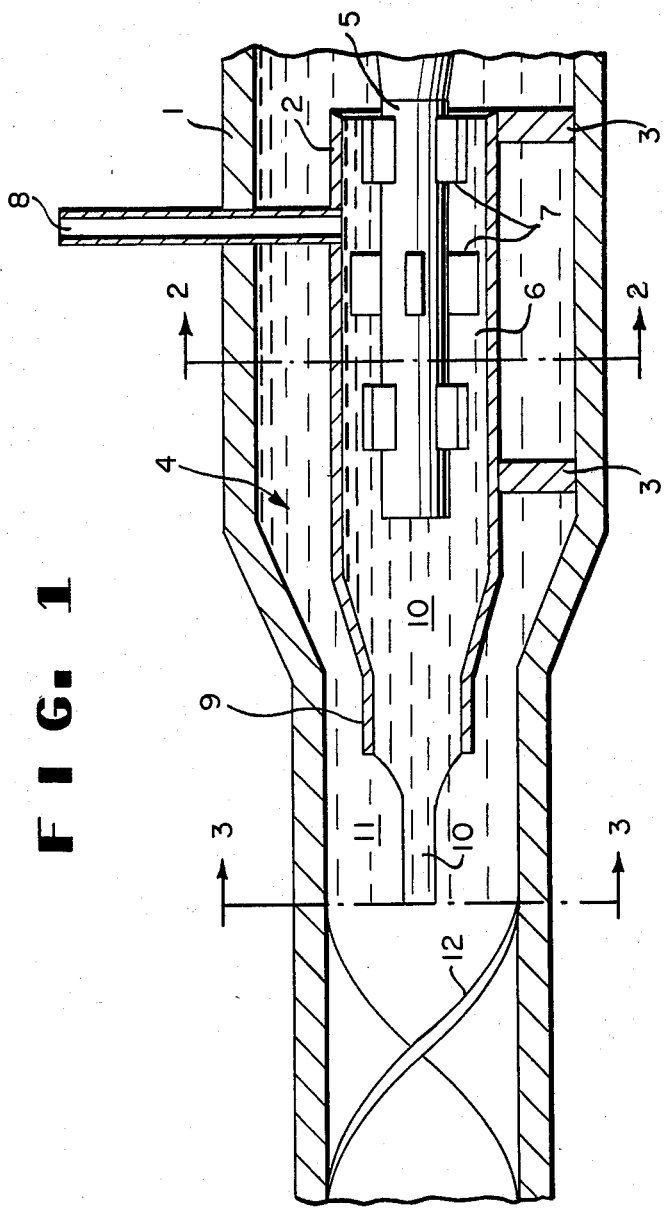
FIG. 1 is a diagrammatic representation of a mixhead attachment, according to a preferred embodiment of the present invention, showing it in attachment with an in-line motionless mixer.

In the mixhead attachment shown diagrammatically in FIG. 1, a cylindrical housing 1 provides the exterior of the attachment and engages an in-line motionless mixer 12 at the outlet end of the attachment along line 3—3 providing fluid communication between the interior of the attachment and the interior of the motionless mixer. Within housing 1, an open-ended, generally cylindrical tube 2 is coaxially positioned and fastened in place by supporting struts 3, leaving a first annular passage 4. By means not shown, the inlet end of the mixhead attachment is designed to operate in direct fluid communication with the discharge end of a dynamic mixhead from which viscous polymerizing fluid emerges. A rotatably mounted mixing shaft 5, is coaxially positioned within tube 2, and is of sufficiently smaller diameter to leave a second annular passage 6. In the most practical application, mixing shaft 5 will be an extension of the rotary shaft conventionally used in the mixhead itself and will be powered by the same source which drives the rotary shaft of the mixhead. As fluid leaves the mixhead and enters the mixhead attachment of the present invention, a portion passes through annular passage 4 and the remainder through annular passage 6. Inlet conduit 8 provides fluid communication between the exterior of the mixhead attachment and the second annular passage 6, allowing for the introduction of pigment to a portion of the fluid. Fins 7, radially positioned on shaft 5, propel the portion of fluid passing through the second annular passage 6, and thoroughly blend it with the pigment, to form fully-pigmented fluid 10. More than one inlet conduit may be utilized, as desired.

In the preferred embodiment, the circumference of generally cylindrical tube 2 diminishes in the direction of flow such that the fully pigmented position of fluid 10 passes from tapered shoulder portion 9 into motionless mixer 12 as a narrow stream surrounded on all sides by the nonpigmented fluid portion 11. It is seldom necessary to provide such a tapered end, however, since flow and pressure alone will ordinarily radially concentrate pigmented stream 10 adequately.

Figure 2:
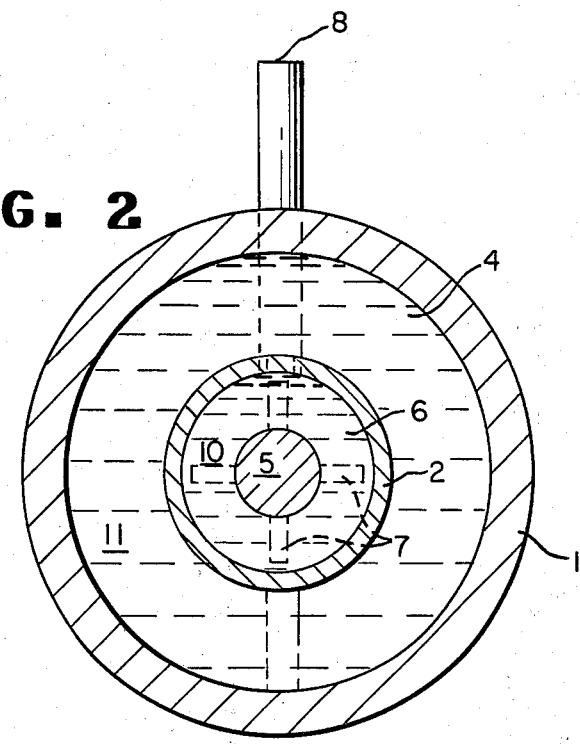
FIG. 2 is a cross-sectional view of the mixhead attachment of FIG. 1 on line 2—2 showing the arrangement of the mixing shaft, fins, and annular passages.

In FIG. 2, the cylindrical housing and inner tube, the annular passages, the mixing shaft and a possible fin arrangement, and a typical support structure are shown cross-sectionally along line 2—2 of FIG. 1. The fins 7 may assume any size and position conductive to thorough blending action. In the preferred embodiment shown in FIG. 2, each fin is arranged at an oblique angle to the direction of fluid flow, thereby imparting a pumping motion to the fluid as mixing shaft 5 rotates. The relative cross-sectional areas of annular passages 4 and 6 may also be varied, depending upon the degree of marbleization desired, to provide various mass or volume ratios of non-pigmented fluid 11 to pigmented fluid 10.

Figure 3:
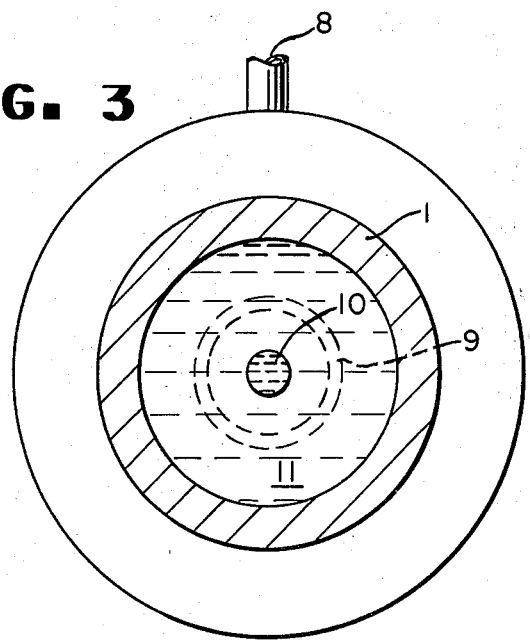
FIG. 3 is a cross-sectional view taken along line 3—3 of FIG. 1 showing the orientation of pigmented and nonpigmented material upon entry into the in-line motionless mixer.

FIG. 3 diagrams the orientation of pigmented and nonpigmented fluid along line 3—3 of FIG. 1, the point at which the fluid enters the in-line motionless mixer 12. As is shown, the stream of pigmented fluid 10 is concentrically positioned within the enveloping stream of nonpigmented fluid 11. It has been found that this discrete positioning of the two streams at their point of introduction to the motionless mixer facilitates uniform marbling and consistent appearance.

In the environment in which the present invention is used to manufacture simulated marble, for example, monomer and polymer sirups, fillers, base-colored pigments, catalysts, promoters, and modifiers are brought together in a reaction zone under controlled conditions. These materials are subjected to high intensity mixing action in a dynamic mixhead to produce a homogeneous, uniformly light-colored, polymerizing mass. The polymerizing mass is then conducted into the mixhead attachment of the present invention, wherein differently-colored pigmentation of a discrete portion occurs as above described. Upon entering the motionless mixer 12, the pigmented portion of polymerizing fluid 10 unites with the nonpigmented stream 11 to form a composite body of two coextensive but substantially distinct and separately identifiable, differently-colored portions. It is to be understood that, at this point, streams 10 and 11 are of substantially identical, relatively high, viscosities so that little diffusion occurs and the streams retain their discrete identities. The final step involves conducting the composite stream from the motionless mixer into a mold assembly of some type wherein final curing and formation of the solid marbleized article occur.

One important aspect of the present invention is that it enables motionless mixers, conventionally employed for complete blending only, to perform incomplete blending for marbling operations with a degree of consistency unequaled in the art. As was noted earlier, it is important that mixing occur rapidly, because the polymerizing fluid begins to gel as soon as the reactive additives are blended in. A second important aspect of the present invention, then, is that it can be used in conjunction with a motionless mixer having fewer curvature elements than would ordinarily be required, if the streams were not discretely positioned, to provide the identical amount of marbleizing. Depending upon the specific composition and end use of the marbleized product, this aspect of the invention and its resultant savings in time can be extremely beneficial.

Prior to the present invention, pigment was often added to the polymerizing fluid prior to its entrance into a motionless mixer. At this point in time, the viscosity of the polymerizing fluid is ordinarily in the range of 30 to 75 poises; the viscosity of the pigment is considerably lower ordinarily from 0.4 to 3.0 poises. Because of its density and viscosity, the polymerizing fluid flows at low Reynolds numbers such that its flow is laminar. It has been been observed from the general nature of viscous effects that the velocity of a viscous fluid flowing through a tube will not be the same at all points of a cross section. The walls of the tube exert a backward drag on the outermost layer of fluid, this in turn exerts a backward drag on the next layer within it, and so on. As a result, the velocity is a maximum at the center of the tube, decreasing, theoretically, to zero at the walls. Not only is the polymerizing fluid subjected to longitudinal variations in velocity, but the velocity vectors produced continually tend to force the lower viscosity pigment, regardless of its point of insertion, outward to the outer walls of the tube. Pigment so positioned will not readily marble the polymerizing fluid when both enter the motionless mixer. Many rotations through the curvature elements of the mixer will be required, and even then the intensity of color and overall marbling effect may vary significantly from one batch to the next.

The objectives met by the present invention resulting in greatly improved marbleization are threefold. First, the viscosity ratio of nonpigmented material to pigmented material is brought as close to 1:1 as is possible. While the viscosity ratio of polymerizing material to pigment may range from 75:1 to 250:1, it is possible to attain a viscosity ratio of nonpigmented polymerizing material to pigmented polymerizing material of approximately 1.1:1 using the present invention. Second, the volume of pigmented material relative to that of nonpigmented material is increased significantly. Typically, several pounds of polymerizing material are used per gram of pigment, and volume ratios of 500:1 to 1000:1 are not uncommon. The present invention makes it possible to select the volume ratio appropriate for a specific end use and desired pattern. Finally, the pigmented portion of the polymerizing fluid is centered at the entrance of the static mixer, in a position promoting maximum marbling. The final product will bear a remarkable similarity to natural marble, can be matched effectively with other products prepared according to the present invention, and will show the veining pattern pattern to good advantage along cut or beveled edges.

It is to be understood that the present invention is not to be limited to the exact details of construction shown and described, for obvious modifications will occur to a person skilled in the art.

What is claimed is:

1. A mixhead attachment for preparing a viscous fluid for marbled pigmentation, said attachment being adapted to convey said fluid from a mixhead to an in-line motionless mixer, said attachment comprising:

a generally cylindrical housing having an inlet end adapted for attachment to said mixhead and an outlet end adapted for attachment to said motionless mixer;

an open-ended, generally cylindrical tube coaxially positioned within said housing and radially separated therefrom, providing a first annular passage for the flow of a portion of said fluid;

means for securing said tube within said housing;

a mixing shaft rotatably mounted within said tube and radially separated therefrom, providing a second annular passage for the flow of the balance of said fluid;

a plurality of fins mounted on said mixing shaft and partially extending into the second annular passage;

means for rotating said mixing shaft; and means for allowing the introduction of pigment into said second annular passage wherein substantially complete pigmentation of said balance of said fluid occurs.

2. The mixhead attachment of claim 1 wherein said generally cylindrical tube tapers inwardly in the direction of the fluid flow.

3. The mixhead attachment of claims 1 or 2 wherein said fins are arranged at an oblique angle to the direction of fluid flow in order to impart a pumping motion to said fluid as said mixing shaft rotates.

* * * * *